United States Patent
Molnar (10) Patent No.: US 10,366,054 B2
(45) Date of Patent: Jul. 30, 2019

(54) METHOD AND APPARATUS FOR FOR SOFTWARE APPLICATION INTERNAL RE-STRUCTURING OF SPECIFICALLY AUTHORIZED MULTI-LEVEL SUB-FOLDERS

(71) Applicant: ABB Schweiz AG, Baden (CH)

(72) Inventor: Rick Molnar, Mentor, OH (US)

(73) Assignee: ABB Schweiz AG, Baden (CH)

( * ) Notice: Subject to any disclaimer, the term of this patent is extended or adjusted under 35 U.S.C. 154(b) by 404 days.

(21) Appl. No.: 15/378,497

(22) Filed: Dec. 14, 2016

(65) Prior Publication Data

US 2017/0169046 A1 Jun. 15, 2017

Related U.S. Application Data

(60) Provisional application No. 62/266,863, filed on Dec. 14, 2015, provisional application No. 62/267,165, filed on Dec. 14, 2015.

(51) Int. Cl.
| | |
|---|---|
| *G06F 17/30* | (2006.01) |
| *G06F 16/16* | (2019.01) |
| *G06F 21/62* | (2013.01) |
| *G06F 16/11* | (2019.01) |

(52) U.S. Cl.
CPC ............ *G06F 16/168* (2019.01); *G06F 16/11* (2019.01); *G06F 16/16* (2019.01); *G06F 21/6218* (2013.01)

(58) Field of Classification Search
CPC ........ G06F 16/168; G06F 16/16; G06F 16/11; G06F 21/6218
See application file for complete search history.

(56) References Cited

U.S. PATENT DOCUMENTS

| | | |
|---|---|---|
| 8,185,580 B2 | 5/2012 | Sallberg |
| 8,195,608 B2 | 6/2012 | Arcese et al. |
| 9,176,826 B1 * | 11/2015 | Smith .................. G06F 9/4411 |
| 9,990,365 B1 * | 6/2018 | Kilpatrick ........... H04L 67/1097 |
| 2006/0242206 A1 * | 10/2006 | Brezak ................ G06F 16/1787 |
| 2007/0220014 A1 * | 9/2007 | Emling ................ G06F 16/168 |
| 2010/0063670 A1 * | 3/2010 | Brzezinski .......... H04L 67/1095 |
| | | 701/31.4 |
| 2013/0091188 A1 * | 4/2013 | Du ........................ G06F 16/182 |
| | | 707/827 |

(Continued)

*Primary Examiner* — Jared M Bibbee
(74) *Attorney, Agent, or Firm* — Taft Stettinius & Hollister LLP; J. Bruce Schelkopf (57) ABSTRACT

Unique systems, methods, techniques and apparatuses of an industrial control system are disclosed. One exemplary embodiment is an industrial control system including a computing device with non-transitory memory device, a user interface, and a processing device. The processing device is structured to execute a set of instructions stored with the non-transitory memory device so as to determine at least one folder but not all folders of a plurality of first level folders are authorized using a first authorization parameter, determine a plurality of second level folders is a subset of the authorized first level folder, determine at least one folder but not all folders of the plurality of second level folders are authorized using the second authorization parameter, generate a directory of authorized folders including the authorized first level folder and the authorized second level folder; and output the directory of authorized folders to the user interface.

13 Claims, 4 Drawing Sheets

(56) References Cited

U.S. PATENT DOCUMENTS

| | | | |
|---|---|---|---|
| 2013/0287208 A1* | 10/2013 | Chong | G05B 19/0426 380/44 |
| 2013/0290729 A1* | 10/2013 | Pettigrew | G06F 21/52 713/187 |
| 2013/0291085 A1* | 10/2013 | Chong | G05B 19/048 726/10 |
| 2016/0109875 A1* | 4/2016 | Majewski | G06F 21/6218 700/98 |
| 2016/0246276 A1* | 8/2016 | Rischar | G05B 19/042 |
| 2017/0169089 A1 | 6/2017 | Molnar | |

* cited by examiner

FIG.5

METHOD AND APPARATUS FOR FOR SOFTWARE APPLICATION INTERNAL RE-STRUCTURING OF SPECIFICALLY AUTHORIZED MULTI-LEVEL SUB-FOLDERS

CROSS REFERENCE TO RELATED APPLICATION

This application claims priority under 35 U.S.C. 119(e) from U.S. provisional patent application No. 62/266,863 filed on Dec. 14, 2015, entitled "Method And Apparatus for Software Application Internal Re-Structuring of Specifically Authorized Multi-Level Sub-Folders" which is hereby incorporated by reference in its entirety.

This application also claims priority under 35 U.S.C. 119(e) from U.S. provisional patent application No. 62/267,165 filed on Dec. 14, 2015, entitled "Method And Apparatus For File Synchronization Based On Qualifying Trigger Actions In Industrial Control Applications" which is hereby incorporated by reference in its entirety.

BACKGROUND

The present disclosure relates generally to creating a directory of authorized folders for an industrial control system. A plurality of controller files are needed to operate an industrial control system. Controller files may be organized within a folder hierarchy stored in memory on a computing device. Since a user may not want to share all the files stored on the computing device with other computing devices of the industrial control system, each controller file may be authorized to be accessed by an industrial control system. Existing file authorization methods suffer from a number of shortcomings and disadvantages. There remain unmet needs including increasing the file authorization complexity capabilities and increasing the user friendliness of the industrial control system user interface. For instance, some industrial control systems require all controller files to located in a single folder and may display computer files not authorized to be shared. Furthermore, a user may need to select a certain subset of the authorized files to be synchronized across the industrial control system. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for an industrial control system are disclosed. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
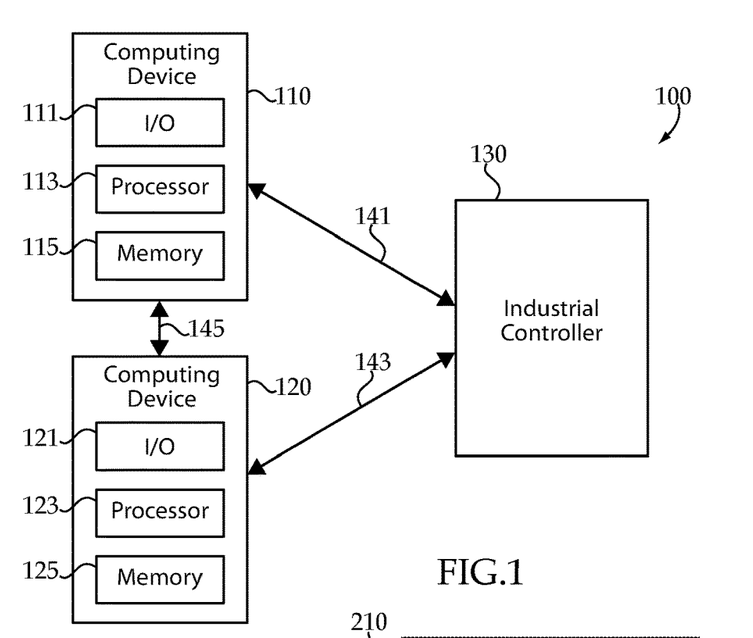
FIG. 1 is a block diagram illustrating an exemplary industrial control system.

With reference to FIG. 1 there is illustrated an exemplary industrial control system 100 including a plurality of computing devices 110 and 120, and an industrial controller 130. It shall be appreciated that industrial controller 130 may be implemented in a variety of scenarios, including a programmable logic controller (PLC), a supervisory control and data acquisition system (SCADA), or a distributed control system (DCS) to name but a few examples. In other embodiments, system 100 includes additional computing devices, each device having the features described herein with respect to computing devices 110 and 120.

Computing device 110 includes an input/output device 111 configured to communicate with other computing devices, such as computing device 120, by way of a communication channel 145. Input/output device 111 is also configured to communicate with industrial controller 130 by way of a communication channel 141. Input/output device 111 may communicate with controller 130 or computing device 120 by way of wired or wireless communication channel.

Computing device 110 includes a processing device 113 and memory device 115. Processing device 113 is structured to communicate with input/output device 111 and memory device 115. As described in more detail below, processing device 113 is configured to analyze computer files stored with memory 115 for the purposes of identifying and assembled a hierarchy of authorized folders and files stored in memory device 115 within system 100.

Computing device 110 is configured to generate a directory of authorized folders, including all files in the authorized folders, for use in the industrial control system. The computing device 110 only allows or "authorizes" specific pre-defined multi-level sub-folders and their children under a variable parent root path. The authorization is distinguishable at the multi-segment level with the processing performed at the branch level. Predetermined special control sync related states are configurable and re-assembled back into the overall authorized segment paths including at the file level. Computing device 110 restricts the internal structure creation and rendering of these very specific authorized path segments to purposefully only process the corresponding folders and files for utilization in the control strategy. Although the authorization needs to be unique and distinguishable at the multi-segment level, the processing must be performed at the individual branch level because this processing includes special rendering for the end user, which makes the internal structuring visibly appealing to distinguish different attributes.

Computing device 110 may automatically authorize or reject within the same processing function or method with incoming parameters having anywhere from single to multiple levels. This functionality benefits and supports the processing at the branch level while still maintaining multi-level authorization integrity and capability. Having only one function yields benefits for implementation, future maintenance and saves disk space. The level is determined through detection of folder path segment separator delimiters. Based on this delimiter detection of the incoming path segment, the pre-determined authorized segments are adjusted to match segment level for comparison processing.

In certain embodiments, the computing device has the capability of tracking the configuration changes made by the user and re-assemble everything back into the overall authorized segment paths at the file level granularity. If the user decides not to save any of their changes, then the internal structure and list of established files remains as it was prior to the said custom rendering. If the user saves his changes, then all of the changes the internal structure file changes for both the enabled and disabled sections must be compiled back into a single set. This is performed by assessing each authorized path one at a time to determine if it was enabled and visible for changes by the user or not. If the authorized path was enabled, then all of the changes and rendered structure for the user are used to append to the overall set. If the authorized path segment is disabled, then the prior structure of that segment upon the initial custom rendering is kept intact and used to append to the overall set. This allows an entire file synchronization plan to be outlined and performed when requested. It shall be appreciated that any or all of the foregoing features of computing device 110 may also be present in the other computing devices disclosed herein.

Computing device 120 includes an input/output device 121, a processing device 123, and a memory device 125. Input/output device 121 is configured to communicate with computing device 110 by way of communication channel 145 and with industrial controller 130 by way of communication channel 143. Communication channel 143 may be a wired or wireless channel.

Figure 2:
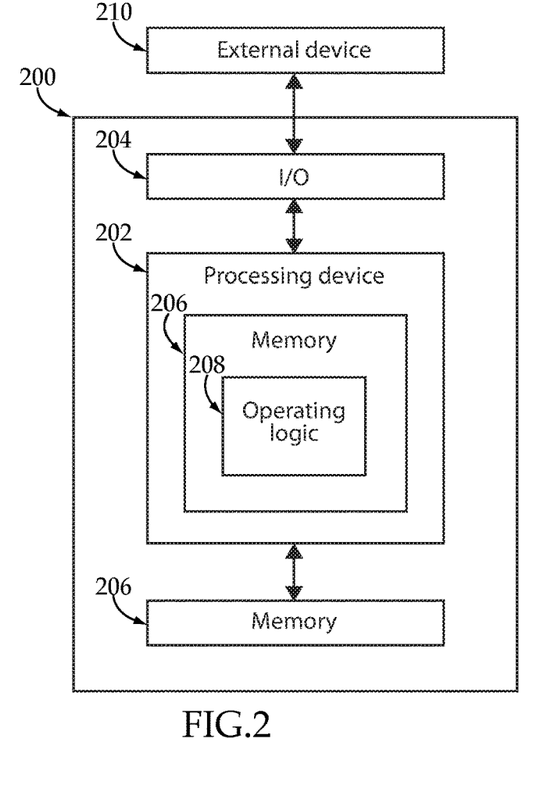
FIG. 2 is a block diagram illustrating an exemplary computing device.

With reference to FIG. 2, there is illustrated a schematic block diagram of a computing device 200. The computing device 200 is one example of the computing device or controller which may be utilized in connection with the industrial control system shown in FIG. 1. The computing device 200 includes a processing device 202, an input/output device 204, memory 206, and operating logic 208. Furthermore, the computing device 200 communicates with one or more external devices 210.

The input/output device 204 allows the computing device 200 to communicate with the external device 210. For example, the input/output device 204 may be a network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computing device 200. For example, the external device 210 may be a sensor, mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

The processing device 202 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of the processing device 202 with multiple processing units, distributed, pipelined, and/or parallel processing can be utilized as appropriate. The processing device 202 may be dedicated to performance of just the operations described herein or may be utilized in one or more additional applications. In the depicted form, the processing device 202 is of a programmable variety that executes algorithms and processes data in accordance with the operating logic 208 as defined by programming instructions (such as software or firmware) stored in the memory 206. Alternatively or additionally, the operating logic 208 for processing device 202 is at least partially defined by hardwired logic or other hardware. The processing device 202 can be comprised of one or more components of any type suitable to process the signals received from the input/output device 204 or elsewhere, and provide desired output signals. Such components may include digital circuitry, analog circuitry, or a combination of both.

The memory 206 may be of one or more types, such as a solid-state variety, electromagnetic variety, optical variety, or a combination of these forms. Furthermore, the memory 206 can be volatile, nonvolatile, or a combination of these types, and some or all of memory 206 can be of a portable variety, such as a disk, tape, memory stick, cartridge, or the like. In addition, the memory 206 can store data that is manipulated by the operating logic 208 of the processing device 202, such as data representative of signals received from and/or sent to the input/output device 204 in addition to or in lieu of storing programming instructions defining the operating logic 208, just to name one example. As shown in FIG. 2, the memory 206 may be included with the processing device 202 and/or coupled to the processing device 202.

Figure 3A:
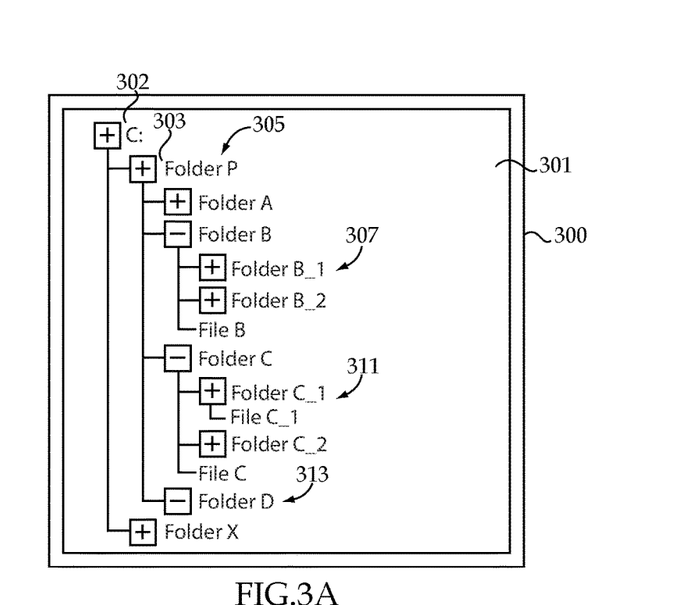
FIG. 3A illustrates a hierarchy of folders stored on an exemplary computing device.

With reference to FIG. 3A there is illustrated a directory of folders 301 stored in memory device 300 structured as a hierarchy of folders and files. The directory of folders 301 includes a C: root 302 which includes parent folder 303, Folder P, and a non-parent folder, Folder X. The parent folder 303 includes a set of first level folders 305 including Folder A, Folder B, Folder C, and Folder D. Folder B includes a set of second level items 307 including Folder B_1, Folder B_2, and File B. Folder C includes a set of second level items 311 including Folder C_1, Folder C_2, and File C. Folder C_1 includes File C_1.

Figure 3B:
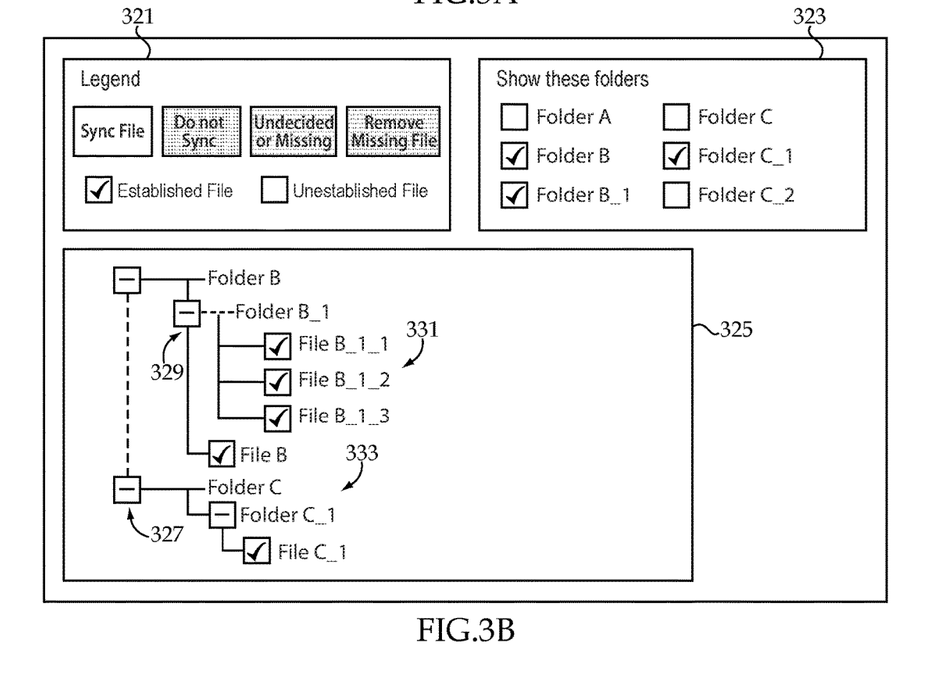
FIG. 3B illustrates a user interface of an exemplary industrial control system.

With reference to FIG. 3B there is illustrated a user interface 320 including a legend 321, an authorized folder selection module 323, and an enabled directory module 325. The legend 321 describes the meaning of highlighting and checkboxes in module 325. Enabled directory module 325 includes a subset of the directory of folders 301 of FIG. 3A which have been authorized for use in an industrial control system, such as system 100 of FIG. 1. Authorized folder selection module 323 includes a plurality of checkboxes, each corresponding to a folder of the directory of folders 301. Module 323 is configured to receive input from a user by checking or unchecking each checkbox. Module 323 includes a list of authorized folders. For example, Module 323 includes Folder A, which is an authorized path of "Folder A\.." or "\Folder A\*.*". If Folder A were checked, the files of Folder A would be displayed in module 325. A checked checkbox indicates the corresponding folder is an enabled folder, while an unchecked checkbox indicates the corresponding folder is not an enabled folder. As illustrated in FIG. 3B, the user has checked the checkboxes corresponding to Folder B, Folder B_1, and Folder C_1, indicating the user has designated the folders as enabled folders. Folder D 313 is a non-authorized folder in the parent root and thus does not appear in module 323.

Figure 4:
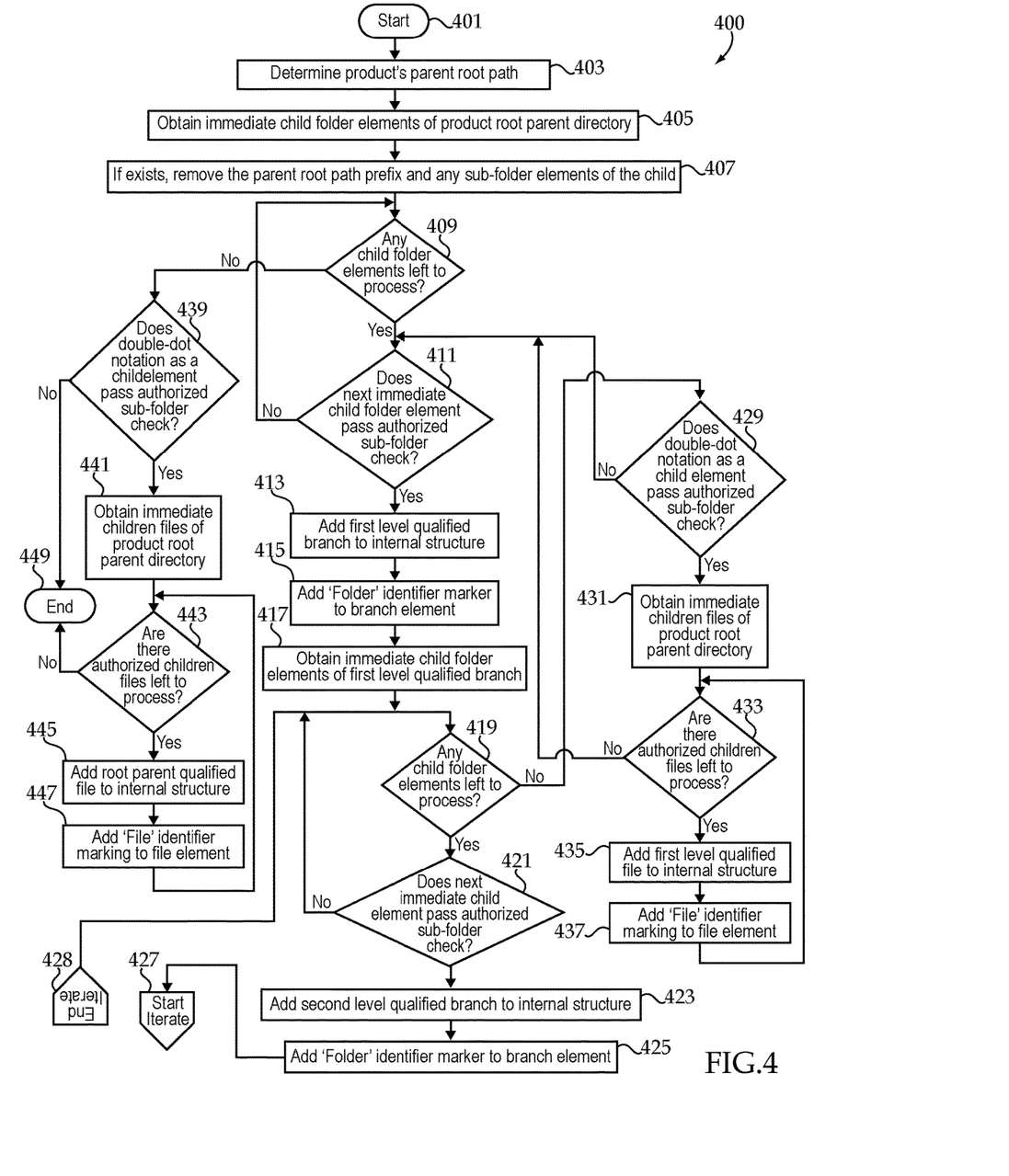
FIG. 4 is a flowchart illustrating an exemplary authorized folder directory generation process.
Figure 5:
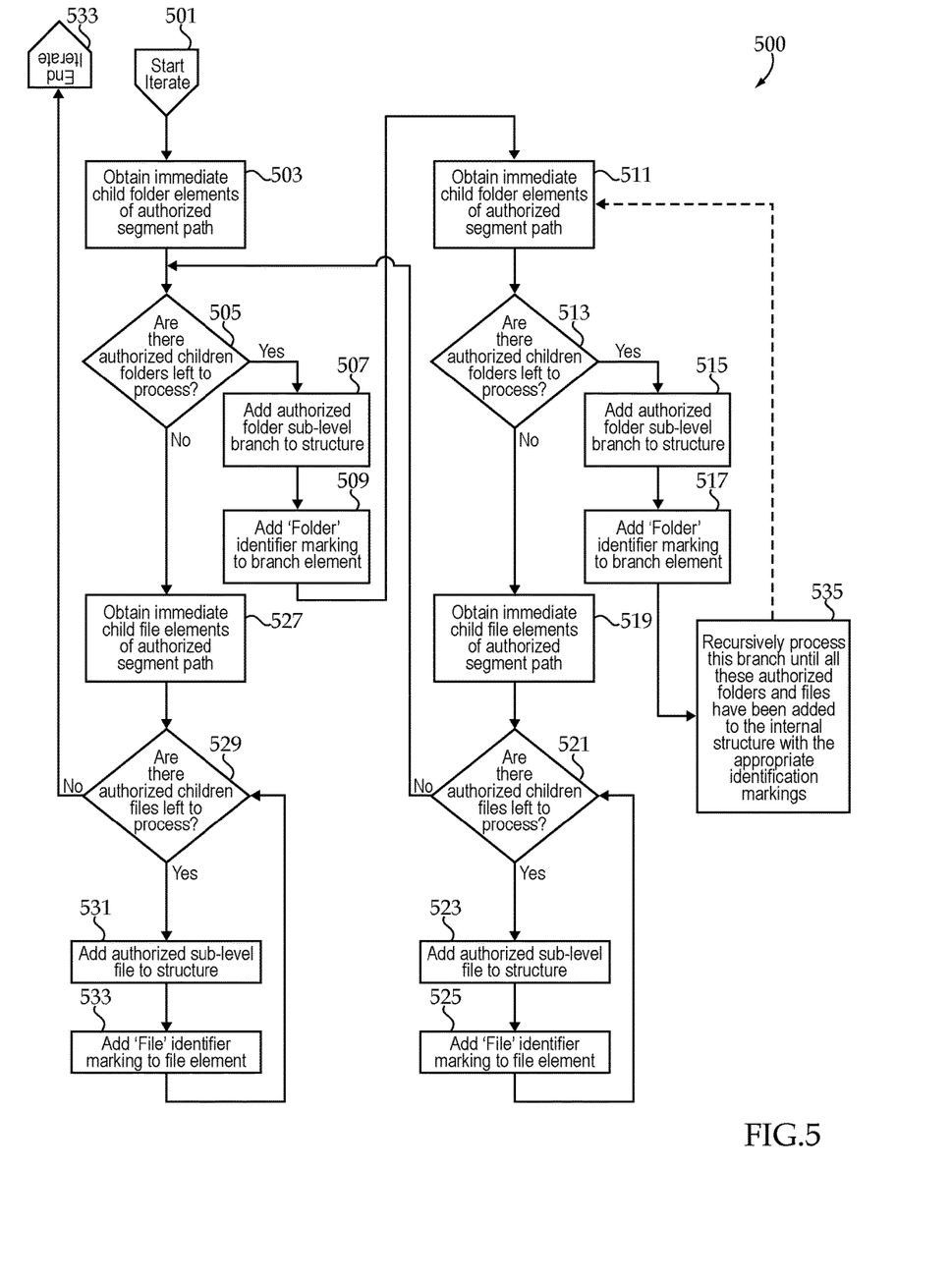
FIG. 5 is a flowchart illustrating an exemplary authorized folder directory generation process.

To further clarify, there are authorized path segments which may be enabled and disabled independently. The directory of enabled folders may be identified by default, then modified by the user input with module 323. This functionality of enabling and disabling authorized path segments is achieved by only passing the array of authorized paths which are enabled. The algorithm illustrated in FIG. 4 and FIG. 5 is implemented and performed so as to render the directory of enabled files displayed with module 325, with the only exception being that the authorized list may consist of all authorized path segments or just the enabled ones.

Enabled directory module 325 is configured to display a directory of enabled folders from a directory of authorized folders identified using the input received from the user with module 323. The directory of enabled folders includes a set of first level folders 327 including Folder B and Folder C. The directory of enabled folders also includes a set of second level items 329 including Folder B_1 and File B within Folder B. Folder B_1 includes a set of files 331 including File B_1_1, B_1_2, and B_1_3. Folder C includes a second level item 333, Folder C_1 which includes a file, File C_1.

The enabled folders are so designated by the user input received in module 323. For example, Folder A is not designated by module 323, therefore Folder A and its contents are not included in the directory of enabled folders. Folder B is designated by module 323, therefore the files and authorized folders within Folder B are included in the directory of enabled folders. Folder B_1 is designated by module 323, therefore the contents of Folder B_1 are included in the directory of authorized folders. Folder C_1 is designated by module 323, but Folder C and Folder C_2 are not designated. Therefore, File C_1 of Folder C_1 is included in the directory of authorized folders, but File C and Folder C_2 are not included.

Next to each listed file in the directory of enabled folders is a checkbox, configured to accept user input as to whether a file is established or unestablished. Established files are considered by the computing devices and industrial controller of system 100 for file synchronization. For example, these files may be identified as 'Ready to Sync' or 'Do Not Sync', which implies that the files are 'Established'. An unestablished file may be identified as such; but, would not be eligible to synchronize until it is upgraded to one of the predetermined 'established' states. These states are configurable; hence, a user can choose to either 'Ready to Sync' or intentionally 'Do Not Sync' or even 'Unestablish' the file. These states are compared after the user has finished configuring them and if any discrepancies are discovered from the initial states of all the listed files, then the application will prompt the user to save (if desired) the states which were just configured.

With reference to FIG. 4, there is illustrated an exemplary process 400 for creating a directory of authorized folders for use in an industrial control system using a computing device, such as computing device 110 in FIG. 1 or computing device 200 in FIG. 2. When performed, the process 400 only permits a predetermined set of folders (and the files therein) stored on the computing device to be accessed by a user. These predetermined folders may be located in multiple different levels under a parent root path. Process 400 may be implemented in whole or in part in one or more of the computing devices disclosed herein. In certain forms the directory creation functionalities may be performed by separate computing devices. In certain forms directory creation functionalities may be performed by the same computing devices.

Process 400 begins at start operation 401 and proceeds to operation 403 where computing device 110 determines the parent root path of the directory of files. Process 400 proceeds to operation 405 where the child folders of the parent root path are identified for analysis. Process 400 proceeds to operation 407 where the parent root path prefix, if any, and sub-folder elements of the child folders are removed.

Process 400 proceeds to conditional 409 where the parent root path is checked for a child folder to analyze. If the parent root path includes a child folder to analyze, process 400 proceeds to conditional 411 where an authorization parameter associated with the child folder is reviewed. If the authorization parameter indicates the child folder is an authorized folder, process 400 proceeds to operation 413, a first level branch is added to the directory of authorized folders. Process 400 proceeds to operation 415 where a folder identifier for the child folder is added to the first level branch. Process 400 proceeds to operation 417 where the child folder elements of the first branch is obtained (the folders within the first child folder).

Process 400 proceeds to conditional 419 where the first branch is checked for a child folder to analyze. If the first branch includes a child folder, process 400 proceeds to conditional 421 where an authorization parameter associated with the child folder is reviewed. If the authorization parameter indicates the child folder is not an authorized folder, process 400 returns to conditional 419. If the authorization parameter indicates the child folder is an authorized folder, process 400 proceeds to operation 423 where a second level branch under the first level branch is added to the directory of authorized files. Process 400 proceeds to operation 425 where a folder identifier for the child folder is added to the second level branch. Process 400 proceeds to a starting point 427 for process 500 described below. Process 400 returns from process 500 at start operation 428.

If conditional 419 determines there are no remaining child folders of the first level branch to be analyzed, process 400 proceeds to conditional 429 where it is determined whether the first level branch post-fixed with double dot notation passes an authorized sub-folder check. If the branch does not pass, process 400 returns to conditional 411. If the branch does pass, process 400 proceeds to operation 431 where the files of the first level branch are identified. Process 400 proceeds to conditional 433 where it is determined whether there is a file identified in operation 431 to be processed. If there are no remaining files, process 400 returns to conditional 411. If a file identified in operation 431 remains to be processed, process 400 proceeds to operation 435 where one file is added to the first level branch of the directory of authorized folders. Process 400 proceeds to operation 437 where a file identifier is added to the first level branch, identifying the file added to the first level branch in operation 435.

If conditional 409 determines there are no child folders from the parent directory to be analyzed, process 400 proceeds to conditional 439 where it is checked whether double dot notation as a child element passes authorized sub-folder check. If the child element does not pass the sub-folder check, process 400 proceeds to end operation 449. If the child element passes the sub-folder check, process 400 proceeds to operation 441, where the files of the root parent directory are obtained. Process 400 proceeds to conditional 443 where it is determined whether there are remaining files to be added to the directory of authorized folders. Process 400 proceeds to operation 445 where a file is added to the root parent path of the directory of authorized folders. Process 400 then proceeds to operation 447 where a file identifier is added to the file element. Process 400 proceeds to conditional 443. When there are no remaining files to be added to the directory of authorized folders, process 400 proceeds to end operation 449.

It shall be further appreciated that a number of variations and modifications to process 400 are contemplated including, for example, the omission of one or more aspects of process 400 or the addition of further conditionals and operations and/or the reorganization or separation of operations and conditionals into separate processes.

With reference to FIG. 5, there is illustrated an exemplary process 500 for creating a directory of authorized folders for use in an industrial control system using a computing device. Process 500 may be implemented in whole or in part in one or more of the control systems disclosed herein. In certain forms the directory creation functionalities may be performed by separate control systems. In certain forms the directory creation functionalities may be performed by the same control system. Process 500 may be executed in conjunction with process 400.

Process 500 begins at start operation 501, which is connected to point 427 of process 400. Process 500 proceeds to operation 503 where the items in a child folder are identified. Process 500 proceeds to conditional 505 where it is determined whether the folder items within the child folder have been analyzed. If all the folder items within the child folder have not been analyzed, process 500 proceeds to operation 507 where an authorized folder is added to a sub-level branch structure. Process 500 proceeds to operation 509 where a folder identifier corresponding to the added folder of operation 507 is added to the branch. Process 500 then proceeds to operation 511 where the folders within the folder added in operation 507 are identified. Process 500 proceeds to conditional 513 where it is determined whether the folder identified in operation have authorized folders remaining to be processed. If there are folders remaining to be processed, process 500 proceeds to operation 515, where the authorized folder is added to the appropriate sublevel branch structure. Process 500 proceeds to operation 517 where a folder identifier is added to the sublevel branch of operation 515. Process 500 returns to operation 511, continuing to loop through operation 511, conditional, operation 515, and operation 517 until all authorized folders have been added to the directory of authorized folders. When there are no remaining folders to analyze, process 500 proceeds from conditional 513 to operation 519, where the files of the folder identified in operation 507 are identified. Process 500 then proceeds to conditional 521 where it is determined whether there are any files of the folder identified in operation 507 remaining to be processed. If files remain, process 500 proceeds to operation 523 where a file identified in operation 519 is added to the appropriate sublevel of the directory of authorized folders. Process 500 proceeds to operation 525 where a file identifier is added to the sublevel of operation 523 for the file added to the sublevel. Process 500 then proceeds to conditional 521.

Once the files identified in operation 519 have been analyzed, process 500 returns to conditional 505. If there are no remaining folders identified in operation 503 left to analyze, process 500 proceeds to operation 527, where the files of the child folder are identified. Process 500 proceeds to conditional 529 where it is determined whether there are remaining files to be analyzed. If files remain to be analyzed, conditional 529 proceeds to operation 531 where a file identified in operation 527 is added to the sub-level structure. Process 500 then proceeds to operation 533 where a file identifier is added to the file added in operation 527. Process 500 then returns to conditional 529. If conditional 529 determines there are no remaining files to be analyzed, process 500 proceeds to end operation 533.

It shall be further appreciated that a number of variations and modifications to process 500 are contemplated including, for example, the omission of one or more aspects of process 500, the addition of further conditionals and operations and/or the reorganization or separation of operations and conditionals into separate processes.

Further written description of a number of exemplary embodiments shall now be provided. One embodiment is an industrial control system comprising a computing device comprising a non-transitory memory device structured to store a directory of folders including a root parent folder, a plurality of first level folders, and a plurality of second level folders associated with one of the plurality of first level folders; a user interface including an authorized folder selection module configured to receive user input corresponding to a first authorization parameter for one folder of the plurality of first level folders and a second authorization parameter for one of the second level folders; and a processing device structured to execute a set of instructions stored with the non-transitory memory device so as to determine a root parent folder file path; determine at least one folder but not all folders of the plurality of first level folders are authorized using the first authorization parameter; determine the plurality of second level folders is a subset of the authorized first level folder; determine at least one folder but not all folders of the plurality of second level folders are authorized using the second authorization parameter; generate a directory of authorized folders including the authorized first level folder and the authorized second level folder; and output the directory of authorized folders to the user interface.

In certain forms of the foregoing system, the system comprises a second computing device including a second user interface. In certain forms, the authorized first level folder includes at least one first level file and the directory of authorized folders includes the first level file. In certain forms, the user interface is configured to identify a synchronization status for each file of the directory of authorized folders. In certain forms, the authorization parameter indicates folder is to be displayed with the user interface. In certain forms, the system comprises an industrial controller. In certain forms, the system comprises a second computing device including a user interface structured to receive the directory of authorized folders and display the directory of authorized folders.

Another exemplary embodiment is a method for operating an industrial control system comprising operating a non-transitory memory device structured to store a directory of folders including a root parent folder, a plurality of first level folders, and a plurality of second level folders associated with one of the plurality of first level folders; operating a user interface including an authorized folder selection module configured to receive user input corresponding to a first authorization parameter for one folder of the plurality of first level folders and a second authorization parameter for one of the second level folders; determining, with a processing device, a root parent folder file path; determining, with the processing device, at least one folder but not all folders of the plurality of first level folders are authorized using the first authorization parameter; determining, with the processing device, the plurality of second level folders is a subset of the authorized first level folder; determining, with the processing device, at least one folder but not all folders of the plurality of second level folders are authorized using the second authorization parameter; determining, with the processing device, the authorized second level folder includes a file; generating, with the processing device, a directory of authorized folders including the authorized first level folder, the authorized second level folder, and the file; and outputting, with the processing device, the directory of authorized folders to the user interface.

In certain forms of the foregoing method, outputting includes displaying the directory of authorized folders. In certain forms, the method comprises changing a synchronization status of a file of the directory of authorized folders using the user interface. In certain forms, the method comprises outputting, to a second user interface, the directory of authorized folders. In certain forms, the method comprises receiving user input selecting a subset of the directory of authorized folders, and wherein outputting includes displaying the selected subset of the directory of authorized folders. In certain forms, outputting includes rendering a file synchronization status associated with a plurality of files stored in the subset of the directory of authorized folders.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. An industrial control system comprising:
    a computing device comprising:
        a non-transitory memory device structured to store a directory of folders including a root parent folder, a plurality of first level folders, and a plurality of second level folders associated with one of the plurality of first level folders;
        a user interface including an authorized folder selection module configured to receive user input corresponding to a first authorization parameter for one folder of the plurality of first level folders and a second authorization parameter for one of the second level folders; and
        a processing device structured to execute a set of instructions stored with the non-transitory memory device so as to:
        determine a root parent folder file path;
        determine at least one folder but not all folders of the plurality of first level folders are authorized using the first authorization parameter;
        determine the plurality of second level folders is a subset of the authorized first level folder;
        determine at least one folder but not all folders of the plurality of second level folders are authorized using the second authorization parameter;
        generate a directory of authorized folders including the authorized first level folder and the authorized second level folder; and
        output the directory of authorized folders to the user interface.

2. The industrial control system of claim 1, further comprising a second computing device including a second user interface.

3. The industrial control system of claim 1, wherein the authorized first level folder includes at least one first level file and the directory of authorized folders includes the first level file.

4. The industrial control system of claim 3, wherein the user interface is configured to identify a synchronization status for each file of the directory of authorized folders.

5. The industrial control system of claim 1, wherein the authorization parameter indicates folder is to be displayed with the user interface.

6. The industrial control system of claim 1, further comprising an industrial controller.

7. The industrial control system of claim 1, further comprising a second computing device including a user interface structured to receive the directory of authorized folders and display the directory of authorized folders.

8. A method for operating an industrial control system comprising:
    operating a non-transitory memory device structured to store a directory of folders including a root parent folder, a plurality of first level folders, and a plurality of second level folders associated with one of the plurality of first level folders;
    operating a user interface including an authorized folder selection module configured to receive user input corresponding to a first authorization parameter for one folder of the plurality of first level folders and a second authorization parameter for one of the second level folders;

determining, with a processing device, a root parent folder file path;

determining, with the processing device, at least one folder but not all folders of the plurality of first level folders are authorized using the first authorization parameter;

determining, with the processing device, the plurality of second level folders is a subset of the authorized first level folder;

determining, with the processing device, at least one folder but not all folders of the plurality of second level folders are authorized using the second authorization parameter;

determining, with the processing device, the authorized second level folder includes a file;

generating, with the processing device, a directory of authorized folders including the authorized first level folder, the authorized second level folder, and the file; and outputting, with the processing device, the directory of authorized folders to the user interface.

9. The method of claim 8, wherein outputting includes displaying the directory of authorized folders.

10. The method of claim 9, further comprising changing a synchronization status of a file of the directory of authorized folders using the user interface.

11. The method of claim 8, further comprising outputting, to a second user interface, the directory of authorized folders.

12. The method of claim 8 comprising receiving user input selecting a subset of the directory of authorized folders, and wherein outputting includes displaying the selected subset of the directory of authorized folders.

13. The method of claim 12 wherein outputting includes rendering a file synchronization status associated with a plurality of files stored in the subset of the directory of authorized folders.

* * * * *